Aug. 4, 1931.      M. LEDUC      1,817,259
APPARATUS FOR MEASURING TRANSMISSION LEVELS
ON TELECOMMUNICATION CIRCUITS
Filed Feb. 15, 1929

Inventor
Marcel Leduc
By
Stone, Boyden, Mack & Taber
Attorneys

Patented Aug. 4, 1931

1,817,259

UNITED STATES PATENT OFFICE

MARCEL LEDUC, OF PARIS, FRANCE, ASSIGNOR TO LIGNES TELEGRAPHIQUES & TELEPHONIQUES, OF PARIS, FRANCE, A CORPORATION OF FRANCE

APPARATUS FOR MEASURING TRANSMISSION LEVELS ON TELECOMMUNICATION CIRCUITS

Application filed February 15, 1929, Serial No. 340,242, and in France February 18, 1928.

The present invention relates to the measurement of transmission levels on telephonic or telegraphic circuits.

According to the accepted definition, the transmission level of the power at a point in a transmission system is determined by the ratio of the value of the power measured at this point to the value of the power chosen as a zero for reference; likewise, the transmission level of the voltage at a point in a transmission system is determined by the ratio of the value of the voltage observed at this point to the value of the voltage chosen as a zero for reference.

The level is generally expressed by means of either the natural or common logarithm of this ratio. If $P_1$ is the power chosen as zero of reference and if $P_2$ is the power measured at the point being considered, the level of power $n_p$ at this point, (expressed for instance in "Nepers" natural logarithms) will be $$n_p = \tfrac{1}{2} \log_e \frac{P_2}{P_1}$$

The level will have a positive or negative value according as $P_2$ is greater or less than $P_1$.

As a standard of power we have chosen 1 milliwatt:

$$P_1 = 10^{-3} \text{ watt.}$$

and as a standard of voltage $V_1$ the voltage measured at the ends of a resistance $Z_1$ of 600 ohms which consumes one milliwatt from a generator whose internal resistance is 600 ohms. Such a generator will consequently be referred to as the "normal generator". It follows that $V_1 = 0.775$ volt.

It is easy to deduce the power level $n_p$ from the voltage level $n_t = \log_e \frac{V_2}{V_1}$ if the impedance $Z_2$ is known into which the circuit transmits its power at the point where the measurement is being made:—

$$n_p = \tfrac{1}{2} \log_e \frac{\frac{V_2^2}{Z_2}}{\frac{V_1^2}{Z_1}} = n_t - \tfrac{1}{2} \log_e \frac{Z_2}{Z_1}$$

or, $V_2$ being expressed in volts and $Z_2$ in ohms:

$$n_p = \log_e \frac{V_2}{0.775} - \tfrac{1}{2} \log_e \frac{Z_2}{600}$$

In practice, the voltage levels will always be measured and the power levels will be deduced from them by means of the above formula.

The apparatus forming the object of the present invention is intended to measure voltage levels.

The apparatus employed to measure voltage levels generally make use of an amplifying voltmeter. The use of the amplifying voltmeter as a direct reading instrument offers serious difficulties. Even with an instrument in which the deflections are, for all the frequencies used, strictly proportional to the voltages to be measured, each series of measurements requires the calibration of two points on the scale. The voltages to be measured being of very different orders of magnitude, this apparatus can only be used in practice if the sensitivity with regard to the voltage to be measured is adjusted for each measurement.

The apparatus forming the object of the present invention avoids these difficulties. It permits the voltage level to be read off directly. It only makes use of one single sensitivity and only requires the standardization of a single point on the scale.

The voltage levels to be measured in a telephonic or telegraphic transmission are included between two limits $N$ and $n$ corresponding to the voltages $V$ and $v$, the lower limit $v$ being always large enough to be measured easily and exactly by means of an amplifying voltmeter.

The present invention is characterized by:
1. The reduction of the voltage to be measured to a fixed voltage equal to "$v$".
2. The use for this object of a special voltage reducer possessing a variable impedance always sufficient however not to weaken the transmission of current appreciably. The voltage reducer carries graduations which give directly to the value of the transmission level, for example, in natural logarithms.

3. The use of an amplifying voltmeter of very high internal impedance specially constructed to be highly sensitive at the voltage "$v$".

In order to describe more clearly the apparatus for measuring voltage levels embodying the characteristics above mentioned, reference will be had to the accompanying drawings, in which Figs. 1 and 2 illustrate the principle on which the variable impedance is based to give direct readings of voltage levels.

Figure 1:
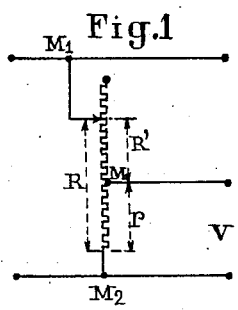

Referring to the drawings, in Fig. 1, between the two points $M_1$ $M_2$ of the system where the measurement is to be made, is placed a shunt resistance R which is variable, but always sufficiently high so as not to disturb appreciably the normal working of the system. Let $V_2$ be the voltage between the points $M_1$ $M_2$; along R a resistance $r$ is obtained such that the potential difference between its ends M and $M_2$ is equal to the fixed voltage $v$. We then have:

$$R = R' + r$$

and $$\frac{V_2}{v} = \frac{R}{r} = \frac{R'+r}{r}$$

Figure 2:
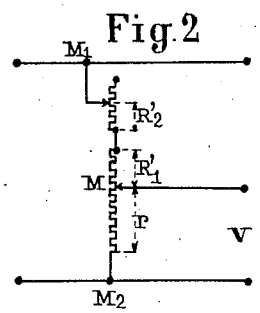

$R^1$ is split up into two parts $R'_2$ and $R'_1$ $$R' = R'_1 + R'_2$$

in such a way that $R'_1 + r = c$, $c$ being constant. Such a method of splitting up is represented diagrammatically by Fig. 2. This gives:—

$$\frac{V_2}{v} = \frac{R'_1+r}{r}\left(1 + \frac{R'_2}{R'_1+r}\right)$$

According to the definition given above the voltage level corresponding to $V_2$ will be:—

$$n_t = \log_e \frac{V_2}{V_1} = \log_e \frac{V_2}{v} + \log_e \frac{v}{V_1}$$

$\frac{v}{V_1}$ being constant, $\log_e \frac{v}{V_1} = k$ $$n_t = k + \log_e \frac{c}{r} + \log_e\left(1 + \frac{R'_2}{c}\right)$$

In this way it is seen that, the variations of two independent terms correspond with the variations of $n_t$ one of these varying with $r$ and the other with $R'_2$.

Large variations of $n_t$ will be followed by manipulation of $r$ and regulation will be completed by means of $R'_2$.

There is obtained:

$$(I) \begin{cases} k + \log_e \frac{c}{r} = n_1. \\ \log_e\left(1 + \frac{R'_2}{c}\right) = n_2. \end{cases}$$

It will be easy to establish a connection between the value of the resistance $r$ and the position of the slider or switch which permits the variation of $r$ in such a way as to read directly the value of $n_1$. In the same way a connection may be established between the positions of the slider or switch which permits the variation of $R'_2$ in such a way as to read directly the value of $n_2$. The voltage lever will then be expressed by the algebraic sum of these two readings:

$$n_t = n_1 + n_2$$

There is described, hereafter, by way of example, a method of making the voltage reducer for the measurement of voltage levels included between $-3$ and $+2$ nepers, the measurement of the levels being accurate within .05 and the minimum resistance of the reducer being 100,000 ohms.

Figure 3:
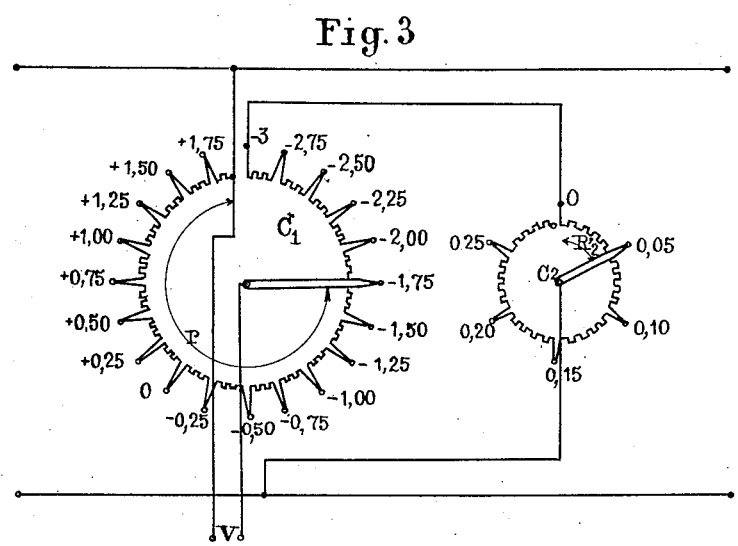
Fig. 3 represents diagrammatically a calibrated impedance constructed according to the invention.

The reducer is made according to the diagrammatic arrangement represented by Fig. 3.

The dial $C_1$ which corresponds to the variations of $r$ gives the values of $n_1$; it carries 20 contact points and is graduated from $-3$ to $+1.75$ by steps of $0.25$. The dial $C_2$ which corresponds to variations of $R'_2$ gives the values of $n_2$; it carries 6 contact points and is graduated from 0 to 0.25 by steps of 0.05.

By means of the formulæ (I) it is easy to calculate the values of $R'_2$ and $r$ corresponding to each contact and then to deduce from them the values of the resistances to be inserted between two consecutive contacts.

We have:

$$\begin{cases} \log_e \frac{c}{r} = n_1 - k. \\ \frac{c}{r} = e^{n_1-k} \\ r = ce^{k-n_1} \end{cases}$$

$$\begin{cases} 1 + \frac{R'_2}{c} = e^{n_2} \\ R'_2 = c(e^{n_2} - 1) \end{cases}$$

In the example chosen $c = 100,000$ ohms and $$k = \log_e \frac{v}{V_1} = -3$$

To make the measurement of the voltage level it is only necessary to turn the handle of dial $C_1$ starting from level $+1.75$ and going towards the lesser levels until the pointer of the voltmeter is in line with a fixed mark corresponding to voltage $v$: generally it is only possible to get approximately over the mark and the setting must be perfected by manipulating the handle of dial $C_2$. If, for example, the position of the handle of dial $C_1$ corresponds to the division $n_1 = -2.75$ and the handle of dial $C_2$ to division $n_2 = +0.05$, the voltage level will be:

$$n_t = n_1 + n_2 = -2.75 + 0.05 = -2.70$$

It would be easy to find a method of graduating the dials which gives the levels by arithmetical addition of the divisions. By way of example, there is represented in Fig. 4 such a method in practice.

Dial $C_1$ carries two sets of graduations one corresponding to positive levels from 1.75 to 0 and agreeing with the corresponding divisions of Fig. 3—for simplicity it may be assumed that the figures of these graduations have been painted in black on the instrument, the other graduations corresponding to negative levels $n'_1$ and going from 0 to 2.75 with figures painted in red—these replace the divisions going from $-0.25$ to $-3$ in Fig. 3.

Figure 4:
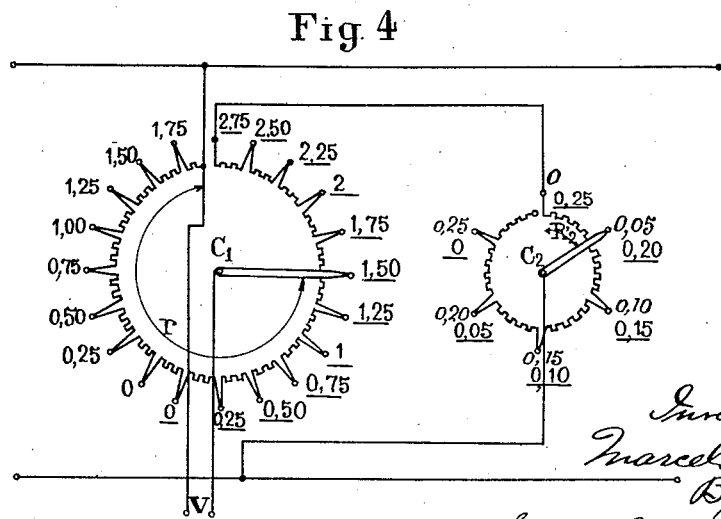
Fig. 4 shows a modified form of the device represented in Fig. 3.

In Fig. 4 the figures of the negative graduations have been underlined and those of the positive graduations have not been underlined. Thus the equation $n'_1 = -(n_1 + 0.25)$ is obtained.

The dial $C_2$ carries two sets of graduations: one in black (figures not underlined) from 0 to 0.25 identical with the graduations in Fig. 3 and graduations $n'_2$ in red going from 0.25 to 0 for which $$n'_2 = 0.25 - n_2$$

When the level is positive the graudations painted in black will be read, the values read on the dials $C_1$ and $C_2$ being added together arithmetically. When the level is negative the graduations painted in red are used, and values read on dials $C_1$ and $C_2$ being added together arithmetically.

It is seen in fact that:

$$-(n'_1 + n'_2) = -[-(n_1 + 0.25) + (0.25 - n_2)]$$
$$= n_1 + n_2$$

For example if the level is $-2.70$ there is read:

$$n'_1 = 2.50 + 0.20 = 2.70$$

on the red graduations.

Figure 5:
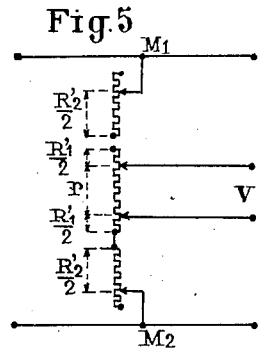
Fig. 5 illustrates a modified arrangement of the resistances shown in Figs. 1 and 2.

If required, the apparatus may be constructed so that its parts are disposed symmetrically with regard to the two conductors of the circuit between which the measurement is to be made, for instance in the manner shown in Fig. 5.

The amplifying voltmeter should have an internal resistance very large in comparison with $r$.

In order to calibrate this amplifying voltmeter, that is to say to determine the division of this instrument which corresponds to the fixed voltage $v$ it would be possible, for instance, to use the normal generator previously defined and make it supply current to the terminals of a resistance of 600 ohms. The level at the terminals of this resistance would be found by placing the handles of the dials $C_1$ and $C_2$ on the zero contacts; the division over which the needle of the amplifying voltmeter then stops corresponds to the fixed voltage $v$. The amplifying voltmeter may be constructed in such a way that the calibration of the instrument made at a certain frequency will hold good for the whole range of frequencies used.

Although certain specific forms of apparatus have been described by way of example, other constructions may be readily evolved without departing from the spirit of the invention. It is clear also that the formulæ which have been developed will hold good as well for common logarithms as for natural logarithms and in this connection it is to be understood that where reference is made in the appended claims to the base of natural logarithms ($e$), such reference is intended to include also the base of common logarithms.

In addition, it will be understood that the principle of the potentiometer and voltmeter arrangement for the measurement of voltage levels can be extended to all apparatus for measuring transmission equivalent attenuation and amplification and in general to all measurements reducible to a measurement of voltage. It is sufficient to state that the voltage to be measured can be reduced to a fixed value while the measurements still retain a sensitivity sufficient for practical purposes.

I claim:

1. Apparatus for the measurement of voltages and voltage levels, comprising the combination with two conductors of a calibrated high impedance, an amplifying voltmeter connected in shunt with a portion of said impedance, means for adjusting said impedance to produce a fixed predetermined reading in said amplifying voltmeter, and means for indicating directly by the setting of said calibrated impedance the voltage or the voltage level between said conductors.

2. Apparatus for the measurement of voltages and voltage levels between two conductors comprising in combination with said conductors an amplifying voltmeter of high internal impedance and highly sensitive at a fixed predetermined voltage and a voltage reducer consisting of a variable impedance connected in shunt with said conductors and adapted to be varied so as to operate said amplifying voltmeter at said fixed voltage, said variable impedance having a fixed minimum value which is always sufficient not to appreciably affect the electrical conditions of said conductors.

3. Apparatus for the measurement of voltages and voltage levels comprising the combination with two conductors of an amplifying voltmeter having a high sensitivity for a particular fixed voltage, a voltage reducer having two adjustments, a coarse adjustment and a fine adjustment, and means for indicating the voltage or voltage level between said conductors by the algebraic sum of the settings of said adjustments required to produce a reading in said amplifying voltmeter corresponding to said fixed voltage.

4. Apparatus for the measurement of voltages and voltage levels comprising the combination with two conductors of an amplifying voltmeter having a high sensitivity for a particular fixed voltage, a voltage reducer having two adjustments, a coarse adjustment and a fine adjustment, and means for indicating the voltage or voltage level between said conductors by the arithmetic sum of the settings of said adjustments required to produce a reading in said amplifying voltmeter corresponding to said fixed voltage.

5. Apparatus for the measurement of the voltage level between two conductors, comprising in combination with said conductors a calibrated high impedance comprising a fixed impedance and a variable impedance connected in series, an amplifying voltmeter connected in shunt with a variable portion of said fixed impedance, means for adjusting said variable impedance and said variable portion of said fixed impedance to produce a fixed predetermined reading in said amplifying voltmeter, and means for indicating directly by the settings of said calibrated impedance the voltage level to be measured.

6. Apparatus for the measurement of voltages and voltage levels, comprising the combination of two conductors, a calibrated high impedance in shunt therewith and comprising a fixed impedance and a variable impedance connected in series, an amplifying voltmeter connected in shunt with a variable portion of said fixed impedance, means for adjusting said variable impedance and said variable portion of said fixed impedance, and means for indicating directly by the algebraic sum of the readings of said variable impedance and said variable portion of said fixed impedance the voltage or the voltage level to be measured.

7. Apparatus for the measurement of voltages and voltage levels, comprising the combination of two conductors, a calibrated high impedance in shunt therewith and comprising a fixed impedance and a variable impedance connected in series, an amplifying voltmeter connected in shunt with a variable portion of said fixed impedance, means for adjusting said variable impedance and said variable portion of said fixed impedance, and means for indicating directly by the arithmetic sum of the readings of said variable impedance and said variable portion of said fixed impedance the voltage or the voltage level to be measured.

8. Apparatus for the measurement of the voltage level between two conductors comprising the combination with said conductors of a calibrated high impedance comprising a fixed impedance and a variable impedance, contact members associated with each of said impedances and adapted to make selective contact at points therealong, and an amplifying voltmeter connected at its terminals respectively to the contact member of said fixed impedance and the end of the latter connected to one of said conductors, the amounts of impedance $r$ between consecutive points along said fixed impedance being calculated from the formula $$r = ce^{k-n1}$$

and the amounts of impedance $R'_2$ between the points along said variable impedance being calculated from the formula $$R'_2 = c(e^{n2} - 1)$$

where $n_1$, $n_2$ represent voltage levels and $c$, $k$ are constants.

9. Apparatus for the measurement of the voltage level between two conductors, comprising in combination with said conductors and connected in shunt therewith a fixed impedance and a variable impedance connected in series, each of said impedances comprising a plurality of impedances connected in series between a plurality of contacts, the values of said impedances being so calculated that said contacts indicate voltage levels, contact members operatively associated respectively with said fixed impedance and said variable impedance and an amplifying voltmeter electrically connected between the end of said fixed impedance connected to one of said conductors and its contact member, whereby on manipulation of said contact members to produce a fixed predetermined reading in said amplifying voltmeter, the voltage level between said conductors is given directly.

10. Apparatus for the measurement of voltages and voltage levels, comprising the combination with two conductors of an amplifying voltmeter of high internal impedance, a voltage reducer comprising two high impedances of circular or annular form connected together in series, a number of contact points along each of said impedances, a rotating contact member or switch arm on each of said impedances making selective contact with said contact points, a connection between the free end of one of said impedances and one of said conductors, a connection between the rotating contact member of the other of said impedances and the other of said conductors, a connection between the first of said conductors and one terminal of said amplifying voltmeter, and a connection between the rotating contact member of the first of said impedances and the other terminal of said amplifying voltmeter.

In testimony whereof I have hereunto affixed my signature.

MARCEL LEDUC.

Certificate of Correction

Patent No. 1,817,259. Granted August 4, 1931, to

MARCEL LEDUC

It is hereby certified that error appears in the printed specification of the above numbered patent requiring correction as follows: Page 3, line 39, for the misspelled word " graudations " read *graduations* ; same page, line 53, in the formula, for " $n'_1$ " read $n'_i$; and that the said Letters Patent should be read with these corrections therein that the same may conform to the record of the case in the Patent Office.

Signed and sealed this 3rd day of November, A. D. 1931.

[SEAL.] M. J. MOORE,
*Acting Commissioner of Patents.*